Feb. 26, 1935.  F. HAYDEN  1,992,913
AMPHIBIOUS VEHICLE
Filed March 30, 1933   2 Sheets-Sheet 1

INVENTOR
Fred Hayden.
BY
his ATTORNEY

Feb. 26, 1935.  F. HAYDEN  1,992,913
AMPHIBIOUS VEHICLE
Filed March 30, 1933  2 Sheets-Sheet 2
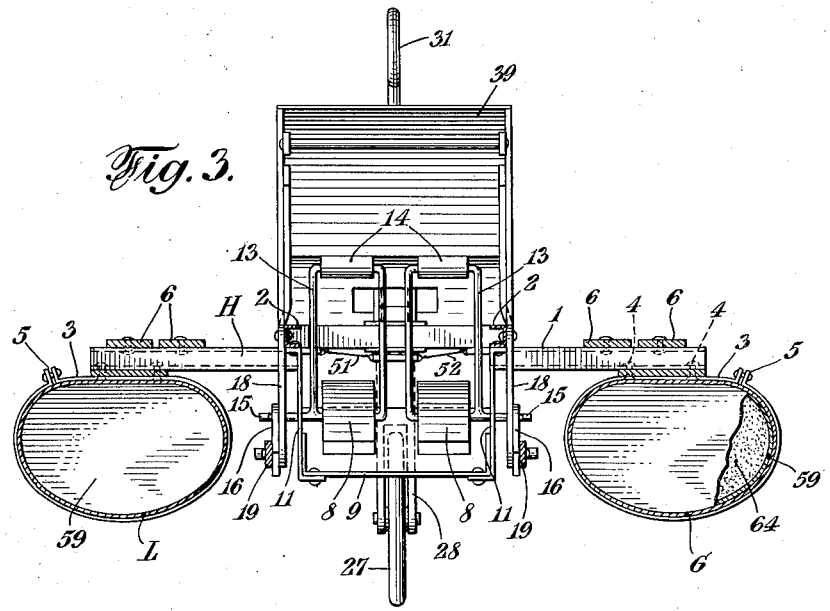
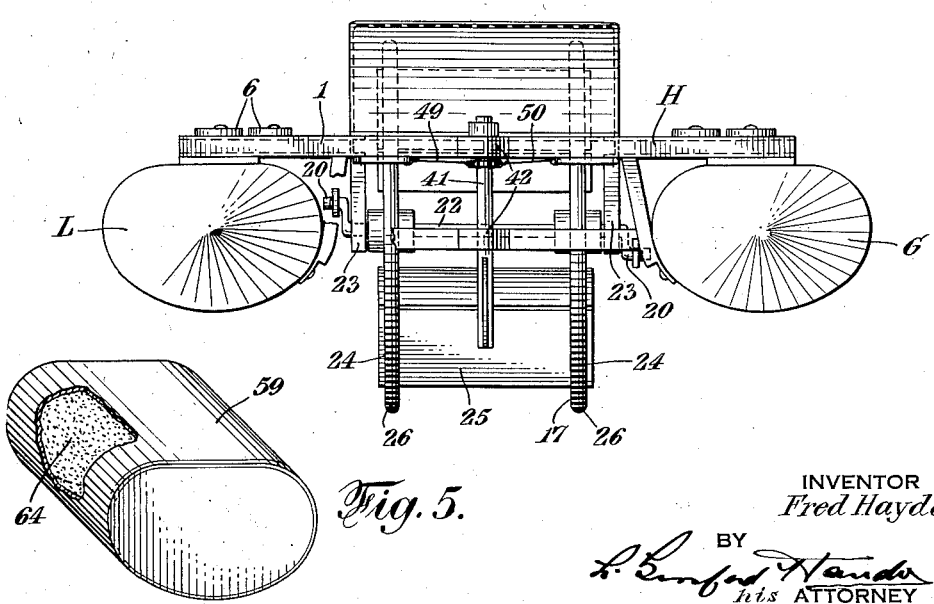
INVENTOR
Fred Hayden.
BY
his ATTORNEY Patented Feb. 26, 1935

1,992,913

UNITED STATES PATENT OFFICE 1,992,913

AMPHIBIOUS VEHICLE

Fred Hayden, Nutley, N. J.

Application March 30, 1933, Serial No. 663,465

1 Claim. (Cl. 115—2)

This invention relates to an amphibious vehicle, and an object of the invention is to provide a practical, substantial and desirably light weight structure floatable in water and adapted to be easily and efficiently propelled by the foot power of a rider, if desired.

A further object is to so construct the device that it may be as readily used for land travel as for water travel, to the end that the rider may at will propel and guide himself along any desired route either or both on land or on water as these elements may be encountered along the route.

A further object is to so construct the device that it will be unsinkable.

A further object is to so construct the device that it may be produced at small cost.

A further object is to so construct the device that it will include efficient steering mechanism by which to steer the device at all times either on land or on water.

A further object is to so construct the device that a single steering handle is made effective for the steering of the device both on land and on water.

A more specific object is to so construct the device as to include a guide wheel engageable against the ground and controlled by the steering handle to guide the device on land, and said guide wheel being also adapted for serving as a guiding rudder to at least in part guide the device when travelling on water.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claim.

In the accompanying drawings which are to be taken as a part of this specification, and in which I have shown merely a preferred form of embodiment of the invention:—

Fig. 3 is a fragmentary transverse section substantially upon the plane of line III—III of Fig. 2.

Fig. 4 is a rear end view of the mechanism shown in the previous figures, and

Fig. 5 is a detail perspective view, partly broken away, showing one of the compartment forming members comprised in the pontoon structure.

Figure 1:
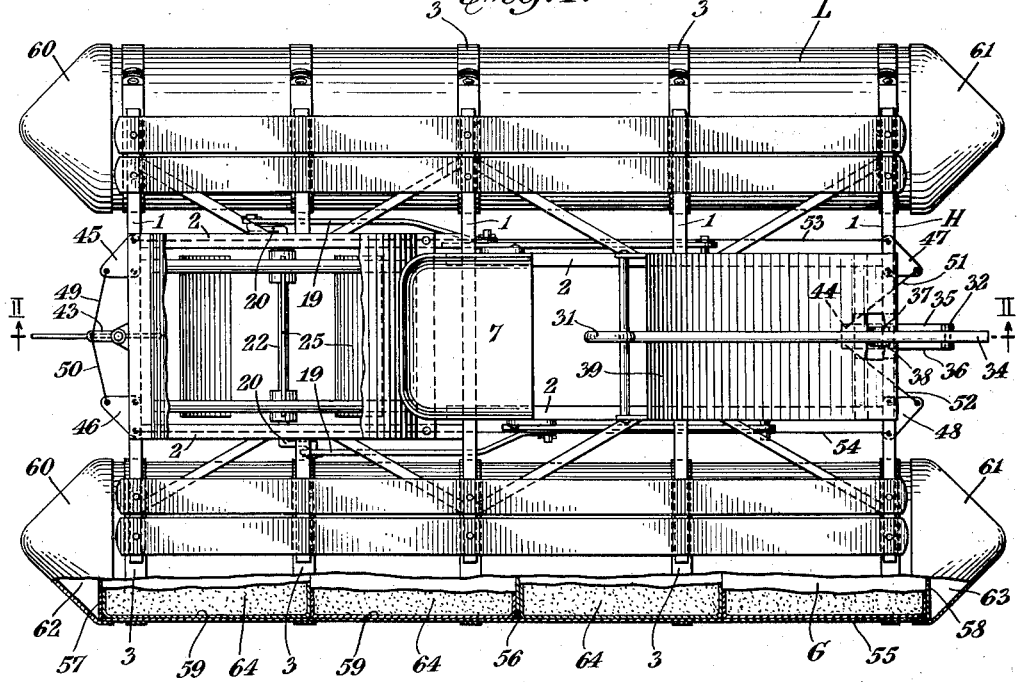
Fig. 1 is a top plan view of a manually propelled boat and pontoon structure constructed in accordance with this invention, a part of one of the pontoon elements being shown in horizontal section for the disclosure of detailed structure.

Referring to the drawings for describing in detail the structure which is illustrated therein, the reference characters L and G indicate two separate pontoons spaced apart in parallel relation along side of each other.

A connecting frame work H is mounted upon these pontoons, and serves to hold them in fixed relation to each other.

The frame work H includes a number of cross sills as 1—1 and longitudinal sills as 2—2 all firmly connected together by rivets or other suitable fastening means. The opposite ends of the cross sills 1—1 overlie the upper surfaces of the respective adjacent pontoons L—G and are rigidly connected with said pontoons by appropriate fastening devices, such for instance as the straps 3—3 which are fixed about the pontoons and to which the sills 1—1 are connected as by means of the rivets or the like as 4—4.

Each of the straps 3 is formed with end portions connected together by suitable fastening devices, as at 5—5, so that said straps may be individually disconnected from the pontoons whenever occasion requires.

Appropriate foot boards as 6—6 may be fixed to the upper surface portions of the cross sills 1—1 overlying the respective pontoons to serve as platforms or walks upon which a passenger may stand or move about.

At approximately the center of the device is arranged a seat as 7 suitably supported upon the central portion of the frame work H and at an appropriate point in front of this seat there is arranged a pair of foot treadles as 8—8 so that a rider seated within the seat 7 may conveniently operate said treadles by his two feet.

A fender or platform structure as 9 is arranged just below the foot treadles and stands normally just above the water level, as indicated by the line 10 in Fig. 2. This platform 9 is suspended from the opposite longitudinal sills 2—2 as by means of brackets 11—11 and it serves the double purpose of supporting the feet of the rider when the feet are not in position against the foot treadles 8—8, and of fending off water which might splash onto the rider while travelling, the forward end of the fender being flared up as at 12—12 for the better performance of the latter mentioned function.

The foot treadles 8—8 are hung at the lower ends of separate, substantially vertically disposed, pedal links as 13—13. These links are pivotally mounted by their upper ends in separate bearings as 14—14 so that the foot treadles 8—8 are mounted to oscillate, pendulum fashion, back and forth beneath the bearings 14.

At its lower end each pedal link is provided with a pivot extension 15, and suitable driving links as 16—16 extend rearwardly from the extensions 15—15 respectively for driving the combined traction and propeller wheel 17. The rear ends of the links 16—16 are supported in oscillatably mounted hangers as 18—18 and have connected thereto extension links as 19—19 which in turn are pivotally attached, by their rear ends, to opposite cranks as 20—20 provided upon the wheel 17, this entire propelling arrangement being such that the back and forth manually effected movement of the foot treadles 8—8 will produce a rotary movement of the wheel 17 at a speed dependent upon the rapidity of movement of the foot treadles.

Any suitable means may be provided for enabling desired adjustment of the position of the foot treadles lengthwise of the device, with respect to the rider's seat, but for this purpose the drawings herewith suggest that the length of the linkage extending between the foot treadles and the wheel 17 may be made adjustable as by providing a series of selectably usable bearing apertures as 21—21 in the links 16—16 where these links are pivotally connected with the hangers 18—18 and with the forward ends of the links 19—19.

The traction and propeller wheel 17 is arranged just behind the rider's seat 7, and in the space between the pontoons L and G, being freely rotatably mounted by means of a horizontal axle 22 supported in opposite bearings as 23—23 pendant from adjacent portions of the longitudinal sills 2—2 and it consists of two separate wheel elements as 24—24 spaced apart on the carrying axle 22 and having a series of paddles 25—25 extending between and connecting said wheel elements together, said paddles being suitably spaced apart and arranged to serve efficiently in contacting the water and propelling the craft along the surface of the water in the manner common to ordinary paddle wheels as will be readily understood.

The separate wheel elements 24—24 are preferably provided with pneumatic or cushion tires 26—26 respectively, said wheels being thereby adapted for easy travel on land, and it is noted, particularly by reference to the illustration Fig. 4, that the tread surface of these tires stands radially beyond the outer edge surfaces of the paddles 25 a suitable distance so that the paddles will not interfere with, or be likely to be injured by, travel of the device on land.

At the forward end of the device, mid-way between the pontoons L and G, is a single supporting and steering wheel 27 mounted between the legs of a forked carrier 28. This carrier is connected with the front cross sill 1 of the frame work H to swing on a vertical axis as at 29 so that by moving the carrier on said vertical axis the wheel 27, which may be either in engagement with the surface of the ground or submerged in water, will operate to guide the device along either the ground or the water, as the case may be.

It is noted that the wheel 27 is not provided with spokes, but is a solid disc and adapted thereby to serve as a more efficient guiding element when the device is travelling on water.

A cushion, or pneumatic, tire as 30 may be provided upon this wheel if desired for improving the riding qualities of the device when travelling on land.

Any appropriate means may be devised wherewith the rider may be enabled to manually move the guiding wheel 27 rotatably upon its vertical bearing 29, but a suitable arrangement to this end is shown in the drawings to include a handle as 31 so connected with the carrier 28 as to move the wheel in either direction by approximate horizontal swinging of the handle. The handle projects to a position of easy accessibility to the rider so that the rider may grasp and move it at will and with comfort and ease.

Preferably, though not necessarily, the manner of connecting the handle with the guide wheel carrier 28 is by means of a pivot as at 32. This pivot is on a horizontal axis so that while it properly effects transmission to the wheel carrier of all horizontal swinging movements of the handle for guiding the device it enables the handle to be freely swung in a vertical plane at any time, and this is desirable since it enables the handle upon occasion to be swung about the pivot 32 from its normal position of accessibility to the rider, as illustrated in full lines in Fig. 2 into an abnormal position projecting forwardly of the device as indicated by the dotted lines 33 in Fig. 2 so that the handle may be employed as a means by which a person, or other draft means present, may conveniently draw the device along either land or water.

Figure 2:
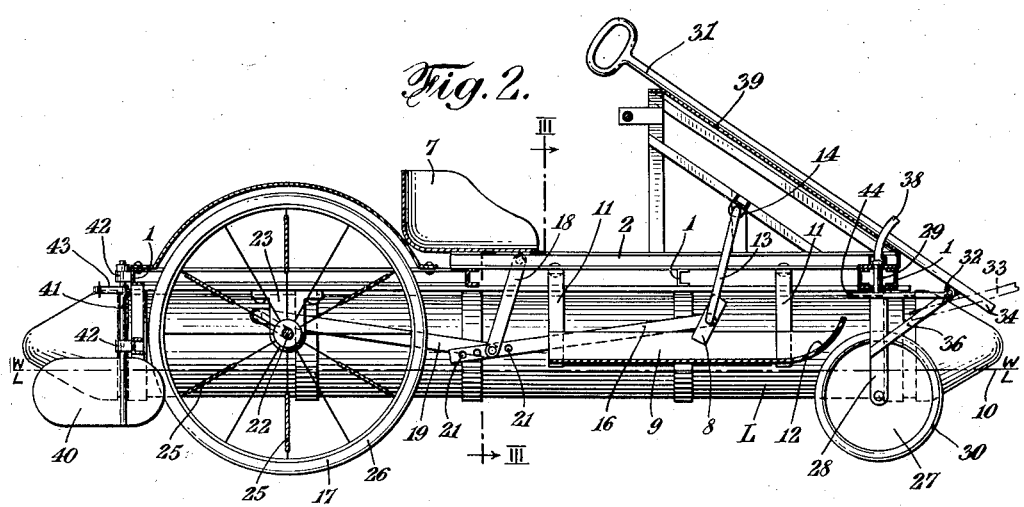
Fig. 2 is a vertical longitudinal sectional view substantially upon the plane of line II—II of Fig. 1.

When the handle is in its abnormal position extending forwardly for draft purposes an end portion as 34 of the handle which projects downwardly beyond the pivot or hinge 32 stands sandwiched between two spaced elements as 35 and 36 of the wheel carrier 28, as shown by reference to Figs. 1 and 2, so as to relieve unnecessary strain from the pivot or hinge 32.

When the handle is in its normal position extending upwardly and rearwardly for steering purposes a portion of the handle removed from the pivot 32 stands sandwiched between two spaced elements as 37 and 38 of the wheel carrier 28, as shown by reference to Figs. 1 and 2, so as to relieve unnecessary strain from the pivot or hinge 32.

An appropriately shaped dash board or shield as 39 is arranged projecting upwardly from the longitudinal sills 2—2 so as to stand in front of the rider and protect him from spray when the device is travelling on water. This dash board or shield serves also as a convenient support and guiding means for the handle 31 when said handle is in its normal steering position.

At the rear end of the device, mid-way between the pontoons L and G, is a simple rudder 40 the vertical shaft as 41 of which is pivotally connected with the frame work H by bearings 42—42. A crank arm 43 is fixed to the upper end of the rudder shaft and from the outer end of this crank arm suitable connections extend forward to a similar crank arm portion as 44 of the wheel carrier 28 so as to insure cooperative movement of the rudder 40 with the wheel 27 to thereby improve the steering efficiency of the device when travelling on water.

The connections between the rudder 40 and the steering wheel 27 may take any appropriate form but for the purpose of illustration the drawings herewith show these connections to include two rear bell-cranks as 45 and 46 and two forward bell-cranks as 47 and 48, the bell-cranks 45 and 46 being connected with the rudder extension 43 by opposingly disposed cables 49 and 50, the bell-cranks 47 and 48 being connected with the wheel carrier extension 44 by opposingly disposed cables 51 and 52, the bell-cranks 45 and 47 being connected by a cable 53 and the bell-cranks 46 and 48 being similarly connected by a cable 54, the cables 53 and 54 extending lengthwise of the frame H and the bell-cranks being so disposed and connected with the several cables that movement of the wheel carrier extension 44 in one direction will produce movement of the rudder extension 43 in a counter direction as will be understood from the illustration Fig. 1, thereby causing the rear end portion of the device, when travelling on water, to be guided always in a lateral direction counter to the lateral direction in which the forward end portion is guided whenever the steering handle 31 is swung to one side or the other.

The several bell-cranks may be conveniently pivotally mounted at suitable localities upon the frame work H.

The pontoons L and G are identical and, while these may be of any suitable construction for rendering them appropriate to accomplish their purpose it is desirable that they be made proof against sinking even though they should become severely damaged as by running into rocks, snags piers and other like obstructions present in streams and rivers.

In the drawings herein the pontoons are shown each to consist of a shell 55 having partitions 56 and end walls 57 and 58.

In the space between the partition 56 and the end walls there is fitted a series of separate auxiliary shells or containers as 59—59, each of the approximate shape and construction as clearly illustrated by the perspective view of one of said containers or shells in Fig. 5.

Opposite end caps as 60 and 61 are shown as fitted over the opposite end walls of the main shell, the spaces, as indicated at 62 and 63, providing additional buoyancy for the pontoons. The spaces 62 and 63 constitute buoyancy providing compartments wholly separate from the remainder of the pontoon and any puncturing of the walls of these separate compartments will merely admit water into the particularly compartment 62 or 63 which may be punctured, the end walls 57 and 58 preventing such water from entering the main shell.

The caps 60 and 61 may be made of slightly heavier and stronger material as compared with the material of the mainshell, and said caps may be given a relatively conical shape to better facilitate easy passage of the pontoon through the water when the device is being propelled on water, the increased strength enabling the caps to withstand many hard knocks to which they may be subjected in ordinary use.

In order to more completely insure against sinking of a damaged pontoon it is proposed that some or all of the auxiliary shells 59 may be filled, or partly filled, with cork or other light weight space filling material, such for instance cork in a granulated form, as indicated at 64.

It will be apparent that a device having the structural characteristics described and illustrated in this application may be constructed at relatively small cost, and that the owner may utilize it in transporting himself, as well as one or more passengers according to the size to which the device is built, over land or water and that he may travel with safety and comparative ease from the land directly into the water or vice versa. It will also be apparent that the device may be of light weight and hence easily propelled by foot power.

While the propulsion means shown and described herein includes a horizontally rotatably mounted paddle wheel and utilizes foot power, it will nevertheless be understood that a screw type propeller may be utilized if desired, and that an explosive or other type of engine may be employed in lieu of the foot power if preferred.

As many changes could be made in this construction without departing from the scope of the invention as defined in the following claim, it is intended that all matter contained in the above description, or shown in the accompanying drawings, shall be interpreted as illustrative only and not in a limiting sense.

Having thus described my invention, what I claim as new and desire to secure by Letters Patent is:—

An amphibious vehicle comprising a pair of floats spaced apart, a frame connecting said floats, a combined traction and paddle wheel rotatably mounted upon the frame in the space between the floats, an axle for said wheel provided with cranks, a pair of peddle links supported by said frame having peddles thereon for manual movement to rotate said wheel, a pair of supporting links pivotally mounted upon the frame positioned intermediate said cranks and said peddles, a pair of connecting links extending from said cranks to said supporting links respectively, and a second pair of connecting links extending from said supporting links to said peddles respectively, the first connecting links being pivotally connected by one end with said cranks and by their opposite ends with said supporting links, the second connecting links being pivotally connected by one end to said peddles and by their opposite ends to said first connecting links and to said supporting links, whereby each peddle is connected with one crank by two connecting links pivoted together and to a supporting link intermediate the crank and the peddle, and at least one of the connecting links for each crank having means enabling adjustment of the length of linkage between said crank and its related peddle, and other guiding and supporting means for the vehicle.

FRED HAYDEN.